United States Patent
Akande et al.

(10) Patent No.: US 10,432,438 B2
(45) Date of Patent: *Oct. 1, 2019

(54) SINGLE CARRIER FREQUENCY DIVISION MULTIPLE ACCESS COMMUNICATION SYSTEM

(71) Applicant: KING FAHD UNIVERSITY OF PETROLEUM AND MINERALS, Dhahran (SA)

(72) Inventors: Kabiru Akande, Dhahran (SA); Naveed Iqbal, Dhahran (SA); Azzedine Zerguine, Dhahran (SA); Abdelmalek Zidouri, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,052

(22) Filed: Nov. 1, 2018

(65) Prior Publication Data

US 2019/0081830 A1    Mar. 14, 2019

Related U.S. Application Data

(63) Continuation of application No. 15/365,188, filed on Nov. 30, 2016, now Pat. No. 10,212,007.

(Continued)

(51) Int. Cl.
*H04L 27/01*    (2006.01)
*H04L 27/26*    (2006.01)
(Continued)

(52) U.S. Cl.
CPC ............ *H04L 27/01* (2013.01); *H04L 5/0007* (2013.01); *H04L 5/0076* (2013.01);
(Continued)

(58) Field of Classification Search
CPC ............... H04L 5/0007; H04L 27/2602; H04L 27/2607; H04L 5/0023; H04L 27/2657; H04L 5/0005; H04L 5/0076
(Continued)

(56) References Cited

U.S. PATENT DOCUMENTS

2003/0028570 A1    2/2003    Albert et al.
2004/0052309 A1    3/2004    Li
(Continued)

OTHER PUBLICATIONS

Shafayat Abrar, et al., "Soft Constraint Satisfaction Multimodulus Blind Equalization Algorithms," IEEE Signal Processing Letters, vol. 12, No. 9, Sep. 2005, pp. 637-640.

Chao Zhang, et al., "Frequency Domain Decision Feedback Equalization for Uplink SC-FDMA," IEEE Transactions on Broadcasting, vol. 56, No. 2, Jun. 2010, pp. 253-257.

*Primary Examiner* — David C Payne
*Assistant Examiner* — Sarah Hassan
(74) *Attorney, Agent, or Firm* — Oblon, McClelland, Maier & Neustadt, L.L.P.

(57) ABSTRACT

A method and apparatus for equalization in a communication system. The method includes receiving an input of a block of symbols, filtering the input in the frequency domain, calculating an error factor in the time domain based on the filtered input, updating tap weights of the equalizer in the frequency domain using circular correlation based on the error factor and the conjugate of the input in the frequency domain, and outputting the filtered input.

6 Claims, 15 Drawing Sheets

Related U.S. Application Data

(60) Provisional application No. 62/261,038, filed on Nov. 30, 2015.

(51) Int. Cl.
*H04L 25/03* (2006.01)
*H04L 5/00* (2006.01)

(52) U.S. Cl.
CPC .... *H04L 25/0305* (2013.01); *H04L 25/03159* (2013.01); *H04L 27/2602* (2013.01); *H04L 27/2607* (2013.01); *H04L 27/2636* (2013.01)

(58) Field of Classification Search
USPC .......................................... 375/240; 348/607
See application file for complete search history.

(56) References Cited

U.S. PATENT DOCUMENTS

| | | | |
|---|---|---|---|
| 2004/0125235 A1* | 7/2004 | Kim | H04N 5/21 348/607 |
| 2005/0080828 A1 | 4/2005 | Johnson | |
| 2008/0198911 A1* | 8/2008 | Hui | H04L 25/03159 375/229 |
| 2010/0080112 A1* | 4/2010 | Bertrand | H04L 27/2657 370/208 |
| 2012/0096061 A1 | 4/2012 | Hauske | |

* cited by examiner

SINGLE CARRIER FREQUENCY DIVISION MULTIPLE ACCESS COMMUNICATION SYSTEM

CROSS REFERENCE

This application is a Continuation of Ser. No. 15/365,188, now allowed, having a filing date of Nov. 30, 2016 which claims benefit of priority to U.S. provisional application No. 62/261,038 having a filing date of Nov. 30, 2015 which is incorporated herein by reference in its entirety.

BACKGROUND

In a communication system, a transmitter may send information via a signal to a receiver. The media between the transmitter and the receiver, through which the signal is sent may corrupt the signal. Intersymbol interference (ISI) is one example of a channel effect that may be approximately eliminated using signal processing.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

An aspect of the present disclosure includes a method for equalization in a communication system. The method includes receiving an input of a block of symbols, filtering, using processing circuitry of an equalizer of a receiver, the input in the frequency domain, calculating an error factor in the time domain based on the filtered input, updating tap weights of the equalizer in the frequency domain using circular correlation based on the error factor and the conjugate of the input in the frequency domain, and outputting the filtered input.

Another aspect of the present disclosure includes an apparatus for equalization in a communication system. The apparatus includes processing circuitry. The processing circuitry is configured to receive an input of a block of symbols, filter the input in the frequency domain, calculate an error factor in the time domain based on the filtered input, update tap weights of the filter in the frequency domain using circular correlation based on the error factor and the conjugate of the input in the frequency domain, and output the filtered input.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
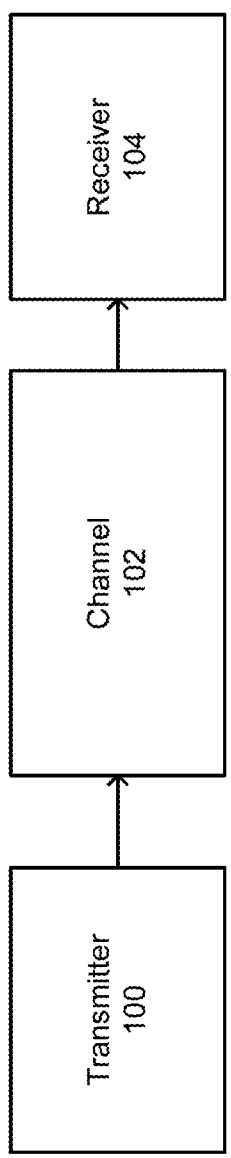
FIG. 1 is a schematic diagram of a communication system according to one example.

Referring now to the drawings, wherein like reference numerals designate identical or corresponding parts throughout several views, the following description relates to apparatuses and associated methodologies for frequency domain blind equalization.

The demand for high data transmission rates have been on the rise in recent years with organizations and individuals requiring ultra high-speed data transmission scheme. Broadband wireless transmission is employed in delivering the high speed data requirement to subscribers in a very hostile radio environment which offers multipath to transmitted signal. The multipath could be severe requiring sophisticated corrective measures at the receiver. Orthogonal Frequency-Division Multiple Access (OFDMA) is a popular technique which uses a low symbol rate modulation specially designed to cope with severe channel conditions in multipath environment as described in J. A. C. Bingham, "Multicarrier modulation for data transmission: an idea whose time has come," *IEEE Communications Magazine*, vol. 28, no. 5, pp. 5-14, 1990. However, OFDMA has a high peak to average power ratio (PAPR) which imposes high power penalty on the mobile users as described in K. Paterson, "Generalized Reed-Muller codes and power control in OFDM modulation," *IEEE Transactions on Information Theory*, vol. 46, no. 1, pp. 104-120, January 2000.

Single-carrier FDMA (SC-FDMA) is a variant of OFDMA with an additional discrete Fourier transform (DFT) processing block hence is referred to as DFT-coded OFDMA as described in H. G. Myung and D. J. Goodman, *Single Carrier FDMA: A New Air Interface for Long Term Evolution*, 2008. SC-FDMA has been adopted in 3GPP LTE uplink scheme due to its lower PAPR while maintaining comparable performance and complexity to OFDMA as described in H. Myung, J. Lim, and D. Goodman, "Single carrier FDMA for uplink wireless transmission," *IEEE Vehicular Technology Magazine*, vol. 1, no. 3, pp. 30-38, September 2006 and N. Benvenuto, R. Dinis, D. Falconer, and S. Tomasin, "Single carrier modulation with nonlinear frequency domain equalization: An idea whose time has come again," *Proceedings of the IEEE*, vol. 98, no. 1, pp. 69-96, 2010.

The lower PAPR feature makes the SC-FDMA suitable for uplink communication benefiting mobile users in terms of low cost and improved power-efficient transmission. However, SC-FDMA is a single-carrier modulation technique whose performance degrades in a multipath environment and as a function of the severity of the multipath. Furthermore, Frequency Domain Decision Feedback Equalization (FD-DFE) was proposed for SC-FDMA in both C. Zhang, Z. Wang, Z. Yang, J. Wang, and J. Song, "Frequency domain decision feedback equalization for uplink SC-FDMA," IEEE Transactions on Broadcasting, vol. 56, no. 2, pp. 253-257, June 2010 and in G. Huang, A. Nix, and S. Armour, "Decision feedback equalization in sc-fdma," in Personal, Indoor and Mobile Radio Communications, 2008. PIMRC 2008. IEEE 19th International Symposium on, September 2008, pp. 1-5. However, the FD-DFE technique assumes time invariant and ideal channel estimate with reduction in bandwidth efficiency as pilot sequence are required for channel estimation.

An equalizer for SC-FDMA without reference symbols is described in S. Yameogo, P. Jacques, and L. Cariou, "A semi-blind time domain equalization of SCFDMA signal," in *IEEE International Symposium on Signal Processing and Information Technology (ISSPIT)*, December 2009, pp. 360-365 and S. Yameogo, J. Palicot, and L. Cariou, "Blind time domain equalization of SCFDMA signal," in *IEEE Vehicular Technology Conference, VTC-Fall*, September 2009, pp. 1-4. The equalizer for SC-FDMA without reference symbols is implemented in time domain making the equalizer unsuitable for channels with long impulse responses due to prohibitive computational complexity.

An adaptive frequency domain DFE is described in S. Yameogo and J. Palicot, "Frequency domain equalization of sc-fdma signal without any reference symbols," in *International Conference on Consumer Electronics*, January 2009, pp. 1-2. The adaptive frequency domain DFE suffers from added complexity of encoder and decoder.

However, since SC-FDMA technique is set up in frequency domain, it is easier to implement its equalization in the frequency domain. The methodology described herein is a frequency domain implementation of soft-constraint satisfaction multimodulus algorithm (FDSCS-MMA) for equalization of SC-FDMA.

SCS-MMA is described in S. Abrar, A. Zerguine, and M. Deriche, "Soft constraint satisfaction multimodulus blind equalization algorithms," *IEEE Signal Processing Letters*, vol. 12, no. 9, pp. 637-640, September 2005 which was derived by applying the principle of soft-constraint satisfaction to relax the constraints in Lin's cost function. Lin's cost function is described in J.-C. Lin, "Blind equalisation technique based on an improved constant modulus adaptive algorithm," *IEE Proceedings—Communications*, vol. 149, no. 1, pp. 45-50, February 2002. This implementation avoids the use of reference symbols in order to improve the spectral efficiency and throughput. This is highly desired due to the fact that in the LTE uplink, a frame has 20 slots and each slot contains 7 SCFDMA symbols. Of these 7, one full training SC-FDMA symbol (preamble) is used followed by 6 data symbols (which has no training) and the channel is estimated (with channel-estimate-based approach e.g. least squares) using this single preamble as described in H. G. Myung, *3Gpp Long Term Evolution: A Technical Overview*, John Wiley & Sons, Inc., 2010. Hence, 1 out of 7 SC-FDMA symbols in the LTE uplink is already designated for channel estimation leading to approximately 14% throughput degradation. Blind algorithms provide attractive solution for SC-FDMA equalization. Also, the FD implementation greatly reduces the computational complexity that is associated with time domain implementation in channels with long impulse responses and has many other advantages as described in N. Bershad and P. Feintuch, "A normalized frequency domain 1 ms adaptive algorithm," *Acoustics, Speech and Signal Processing, IEEE Transactions on*, vol. 34, no. 3, pp. 452-461, June 1986. Furthermore, FDSCS-MMA achieve lower mean square error (MSE) than both the Normalized FD modified constant modulus algorithm (NFDMMA) as described in H. H. Dam, S. Nordholm, and H. Zepernick, "Frequency domain constant modulus algorithm for broadband wireless systems," in *IEEE Global Telecommunications Conference, GLOBECOM*, December 2003, and the popular constant modulus algorithm (CMA).

FDSCS-MMA convergence is greatly improved by normalization of each of the frequency bin in the weight update. The square root of the spectral power of the equalizer input is used for the normalization rather than the spectral power as descried further below.

SC-FDMA is a multi-access single carrier modulation technique with a frequency domain equalization at the receiver and allows parallel transmission of multiple users' data. SC-FDMA is a variant of OFDMA with an additional DFT and IDFT processing block at the transmitter and receiver, respectively.

The system is described in terms of matrices to provide a clear understanding of the system and eases many performance analyses.

FIG. 1 is a schematic diagram of a communication system according to one example. The communication system may include a transmitter 100 and a receiver 104. Data between the transmitter 100 and the receiver 104 is transmitted via a communication channel 102. The transmitter 100 may be any electronic subsystem that produces a modulated signal. The receiver 104 obtains input sample via the communication channel 102 and performs equalization on the input samples to obtain block estimates, which are estimates of transmit blocks (transmitted by the transmitter 100). A data block may be also called a packet, a frame, and so on.

Figure 2:
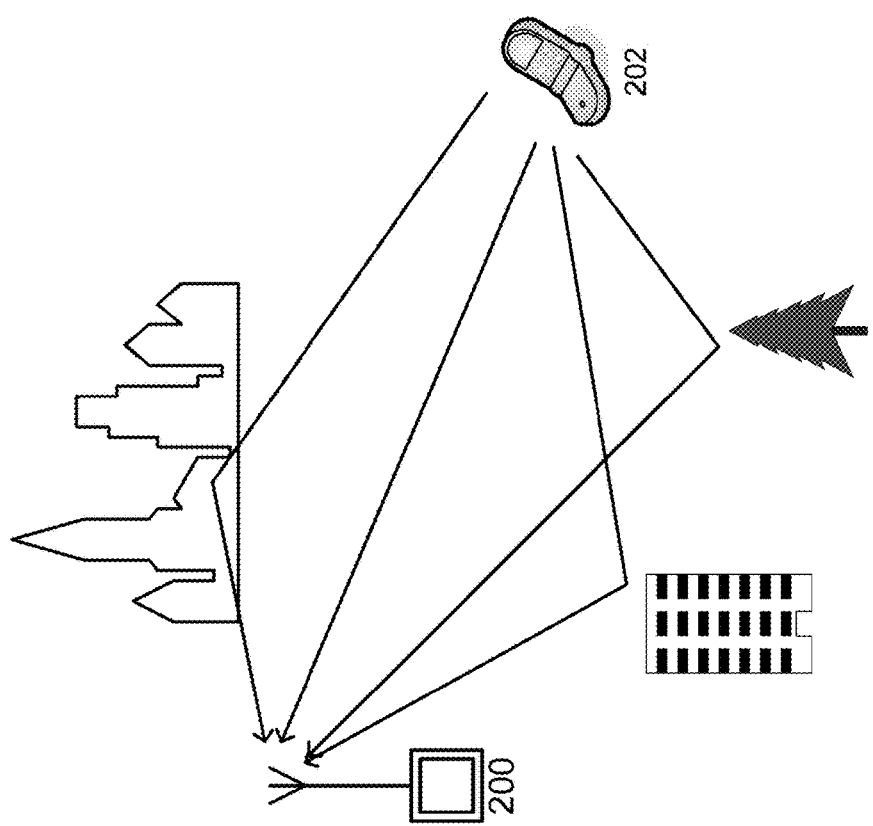
FIG. 2 is a schematic diagram that shows a transmission from a wireless device to a base station according to one example.

FIG. 2 is a schematic diagram that shows a transmission from a wireless device to a base station according to one example. FIG. 2 shows a base station 200 and a wireless device 202. In an uplink transmission system, the transmitter 100 is part of the wireless device 202 and the receiver 104 is part of the base station 200. In other embodiments, the transmitter 100 may be part of the base station 200, and the receiver 104 may be part of the wireless device 202. The base station 200 is typically a fixed station that communicates with the wireless device 202. The wireless device 202 may be fixed or mobile. The wireless device 202 may be a cellular phone, a personal digital assistant (PDA), a wireless modem card, or the like. The wireless device 202 may transmit a signal to the base station 200. The signal may be a radio frequency (RF) signal. The signal may reach the base station 200 in one or more signal paths as shown in FIG. 2. The signals may include a direct path and reflected paths. The reflected paths may be created by reflections from obstacles such as trees, buildings, or other structures. A received RF signal at the base station 200 is a superposition of all received signals at the base station 200.

Figure 3:
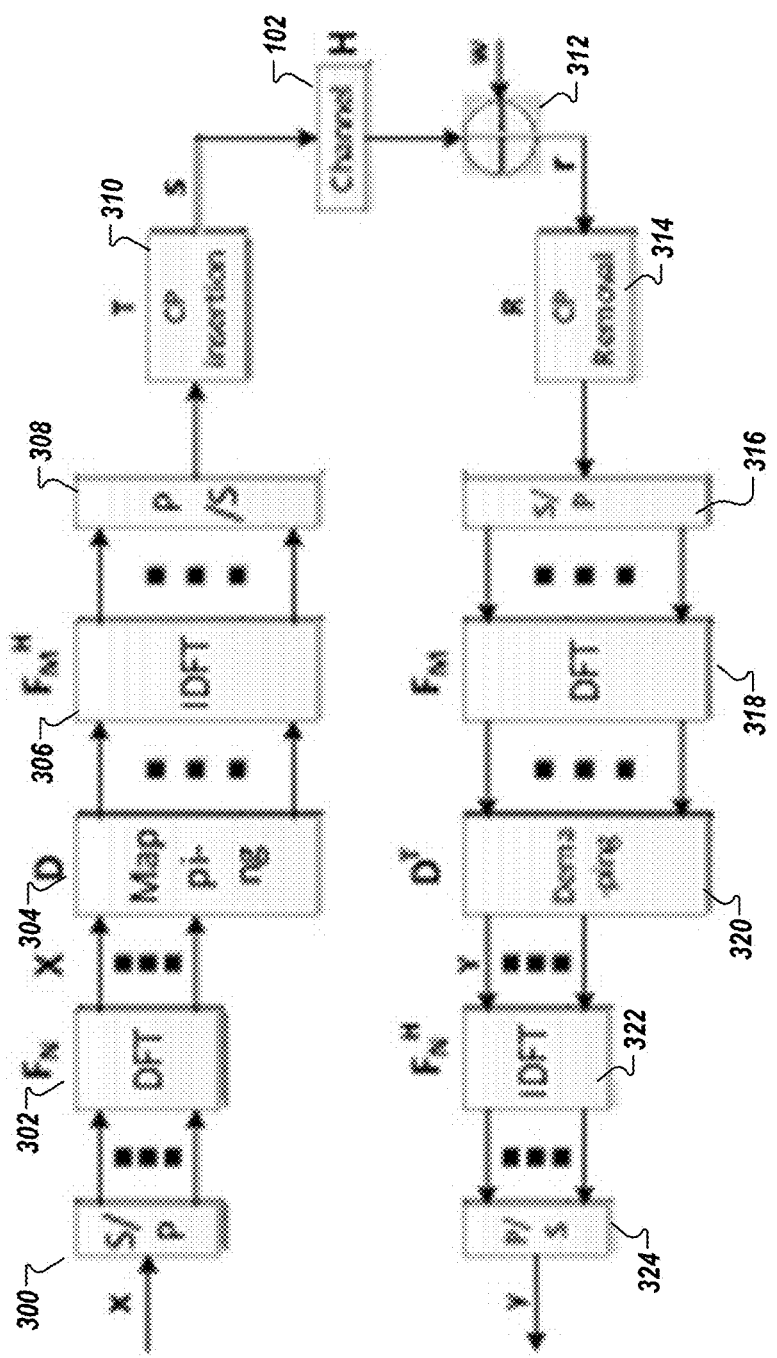
FIG. 3 is a block diagram representation of a transmitter and a receiver according to one example.

FIG. 3 is a block diagram representation of a receiver and a transmitter according to one example. In one embodiment, the communication system may be an uplink SC-FDMA system having Q users and a total of M subcarriers, with each user assigned N subcarriers, i.e. M=QN. The transmitter 100 of the SC-FDMA system may include a serial to parallel converter (S/P) 300, an N-point discrete Fourier transform (DFT) module 302, a subcarrier mapping module 304, an M-point inverse discrete Fourier transform (IDFT) module 306, a parallel to serial (P/S) converter 308, and a cyclic prefix (CP) insertion module 310. The modulated signal is transmitted via the channel 102. Each of the modules described herein may be implemented in circuitry that is programmable (e.g. microprocessor-based circuits) or dedicated circuits such as application specific integrated circuits (ASICS) or field programmable gate arrays (FPGAS).

The receiver 104 may include an antenna (not shown), a filter 312, a CP (cyclic prefix) removal module 314, a S/P converter 316, an M-point DFT module 318, a subcarrier de-mapping module 320, a N-point IDFT 322, and a P/S converter 324. In one embodiment, the receiver 104 also includes an equalizer 400 shown in FIG. 4.

In order to form an SC-FDMA block, sequence of data bits $\{a_n\}$ are first modulated into symbols using any of the modulation methods (BPSK, QPSK or M-QAM). For the $q^{th}$ user, where Q represents the total number of users in the system, data block x consisting of N symbols, is generated from the resulting modulation scheme as $$x=[x_0,x_1,\ldots,x_{N-1}]^T \quad (1)$$

N-point discrete Fourier transform (DFT) of x is taken as $X=F_N x$ to yield frequency coefficients which are then assigned orthogonal subcarriers for transmission over the channel 102. The DFT may be effected by the DFT module 302 of FIG. 3. From the DFT operation, X represents DFT outputs for $q^{th}$ user given as $$X=[X_0,X_1,\ldots,X_{N-1}]^T \quad (2)$$

while $F_N$ is an N×N DFT matrix defined as $$F_N = \left(\frac{1}{\sqrt{N}} e^{-i\frac{2\pi}{N}jk}\right)_{j,k=0,\ldots,N-1}. \quad (3)$$

The $$\frac{1}{\sqrt{N}}$$

is a normalization factor to ensure the same signal output power. There are two ways of assigning subcarriers in SC-FDMA. When adjacent subcarriers are allocated to DFT outputs from the same user such that the user data is confined to only a fraction of the available bandwidth, this is referred to as localized SC-FDMA (LFDMA) but when DFT outputs are spread over the entire bandwidth with zero amplitude allocated to unused subcarriers, it is referred to as distributed SC-FDMA (DFDMA). A special case of DFDMA is interleaved SC-FDMA (IFDMA) where the occupied subcarriers are equally spaced. The allocation schemes can be implemented using a resource allocation matrix D as described in G. Huang, A. Nix, and S. Armour, "Decision feedback equalization in sc-fdma," in *Personal, Indoor and Mobile Radio Communications*, 2008. PIMRC 2008. IEEE 19th International Symposium on, September 2008, pp. 1-5, incorporated herein by reference in its entirety. After allocating the subcarriers (e.g., effected via the subcarrier mapping module 304 of FIG. 3), M-point (M>N) inverse DFT (IDFT) is taken to convert the signal to time domain. In one implementation, the inverse DFT is determined by the IDFT module 306 of FIG. 3. The resulting signal is given as $S=F_M^H X$ where S is the $k^{th}$ SCFDMA symbol consisting of all the users' signal $$S=[S_0,S_1,\ldots,S_{M-1}]^T \quad (4)$$

while $F_M^H$ is an M×M IDFT matrix and H is an Hermitian operator.

The total number of users in the SC-FDMA system equals bandwidth expansion factor Q=M/N where M is the total number of subcarriers. In order to complete an SC-FDMA block, the time domain signal is converted from parallel to serial arrangement (e.g., using P/S converter 308 of FIG. 3) and is cyclically extended by addition of cyclic prefix. A cyclic prefix, which is typically removed at the receiving section (e.g., receiver 104) before any major processing, is obtained by prefixing a symbol with its tail end to achieve mainly two purposes. The CP may be inserted by the CP insertion module 310 of FIG. 3. If the CP length is the same or longer than the length of multipath channel delay spread, it helps prevent interblock interference (IBI) and also enable convolution between the channel impulse response and transmitted signal to be modeled as circular as opposed to normal linear convolution. This make frequency domain equalization easy at the receiver. Thus, the FD blind algorithms may be adapted to equalizing SC-FDMA symbols. The transmitted SC-FDMA block is $$\tilde{S}=[S_P,S_{P-1},\ldots,S_0,S_1,\ldots,S_{M-1}]^T \quad (5)$$

where P is the length of the appended CP. In matrix format, both the transmitted and received signal can be written, respectively as $$\tilde{S}=TF_M^H DF_N x \quad (6)$$

and $$Y=H\tilde{S}+V \quad (7)$$

T and G which are used in adding and removing CP, may be defined respectively as $$T \triangleq \begin{bmatrix} I_{P\times M} \\ I_M \end{bmatrix}, G \triangleq [O_{M\times P} \quad I_M] \quad (8)$$

In equation (8), $I_{P\times M}$ is a matrix used in copying the last P row of $I_M$, $O_{M\times P}$ is an M×P zero matrix and $I_M$ is an M×M identity matrix. H is (P+M)×(P+M) channel matrix and V is (P+M)×1 noise vector. The received signal undergoes the reverse of what it has undergone during the transmitting phase as shown in FIG. 3, hence the input to the equalizer (e.g., equalizer 400 of FIG. 4) is $$Y'=H'x+V' \quad (9)$$

where H' is an N×N diagonal matrix containing the channel frequency response for the $q^{th}$ user and V' is the effective 1×N noise vector.

They are given as $$H'=F_N^H D^T F_M (GHT) F_M^H D F_N \quad (10)$$

and $$V'=F_N^H D^T F_M GV \quad (11)$$

Equation (10) results from the fact that addition and removal of CP turns channel matrix into a circulant matrix and the resulting circulant matrix is diagonalized by DFT processing as described in D. H. Carlson, "Review: Philip j. davis, circulant matrices," *Bulletin (New Series) of the American Mathematical Society*, vol. 7, no. 2, pp. 421-422, 09 1982.

Constant Modulus Algorithm (CMA) is a blind algorithm that is also termed "Property Restoral" algorithm in that it restores the constant envelope of signal, that is lost due to multipath transmission and ISI, at the receiver utilizing only the signal statistics without employing any training or pilot symbols and as such improving the spectral efficiency as described in J. Treichler, C. Johnson, and M. Larimore, *Theory and design of adaptive filters*, ser. Topics in digital signal processing. Wiley, 1987, D. Godard, "Self-recovering equalization and carrier tracking in two-dimensional data communication systems," *Communications, IEEE Transactions on*, vol. 28, no. 11, pp. 1867-1875, November 1980, J. Treichler and B. Agee, "A new approach to multipath correction of constant modulus signals," *Acoustics, Speech and Signal Processing, IEEE Transactions on*, vol. 31, no. 2, pp. 459-472, April 1983.

CMA reduces the error between the magnitude of equalizer output and a circle of constant radius. However, CMA is not able to correct any phase rotation introduced by channel characteristics since its cost function is independent of any phase information. The cost function for CMA is given as $$J_{CMA}(n)=E\{(|z(n)|^2-R)^2\} \quad (12)$$

where z(n) is the output of the equalizer, E[•] denote statistical expectation operator and R is a constant defined as $$R = \frac{E|a(n)|^4}{E|a(n)|^2} \quad (13)$$

Denoting equalizer input vector as $y(n)=[y(n), y(n-1), \ldots, y(n-N+1)]^T$ and equalizer weight vector as $w(n)=[w_0(n), w_1(n), \ldots, w_{N-1}(n)]^T$ for an equalizer of length N, the equalizer output is expressed as $$z(n)=w(n)^H y(n) \quad (14)$$

In order to obtain the optimum coefficients of the equalizer stochastic gradient are used to optimize the defined cost function with respect to the equalizer tap coefficients. Hence, the stochastic gradient of equation (12) is taken with respect to the tap weights vector to obtain $$\frac{\partial J_{CMA}(n)}{\partial w(n)} = e(n) y^*(n) \quad (15)$$

where e(n) is the error factor and is given as $$e(n)=4z(n)(|z(n)|^2-R) \quad (16)$$

and the tap weights vector are recursively updated as $$w(n)=w(n-1)-\mu y(n) e^*(n) \quad (17)$$

MultiModulus Algorithm (MMA) addressed the phase ambiguity of CMA by limiting the ambiguity to within $$\pm \frac{\pi}{2}.$$

The modified form of CMA is described in K. N. Oh and Y. Chin, "Modified constant modulus algorithm: blind equalization and carrier phase recovery algorithm," in *IEEE International Conference on Communications*, June 1995, pp. 498-502 to realize a cost function able to perform both blind equalization and carrier phase recovery simultaneously.

The cost function for MMA is given as $$J_{MMA}(n)=E\{[|z_R(n)|^2-R_{1,R}]^2+[|z_I(n)|^2-R_{1,I}]^2\} \quad (18)$$

where $$R_{1,R} = \frac{E|a_R(n)|^4}{E|a_R(n)|^2} \text{ and } R_{1,I} = \frac{E|a_I(n)|^4}{E|a_I(n)|^2}. \quad (19)$$

and both subscript R and I denote real and imaginary parts, respectively.

However, including both real and imaginary parts of the equalizer output in the cost function and equalizing them separately sometimes results in diagonal solutions as described in J. Yang, J.-J. Werner, and G. Dumont, "The multimodulus blind equalization and its generalized algorithms," *Selected Areas in Communications, IEEE Journal on*, vol. 20, no. 5, pp. 997-1015, June 2002. The error sample for MMA can be derived from equation (18) and is given as $$e(n)=2[z_R(n)(z_R^2(n)-R_{1,R})+jz_I(n)(z_I^2(n)-R_{1,I})] \quad (20)$$

a circulant matrix and the resulting circulant matrix is diagonalized by DFT processing.

A blind algorithm, proposed by Lin and described in C. Lin, "Blind equalisation technique based on an improved constant modulus adaptive algorithm," *IEE Proceedings-Communications*, vol. 149, no. 1, pp. 45-50, February 2002, is derived by using the dispersion of real and imaginary parts of the equalizer output of MMA algorithm as constraints and minimizing the squared euclidean norm of the change in the tap-weight vector to ensure that error samples approach zero. The proposed technique is based on the principle of minimum disturbance. From Lin algorithm, another algorithm termed Soft-Constraint Satisfaction Multimodulus Algorithm (SCS-MMA) is derived by relaxing the constraints defined by Lin using principle of soft-constraint satisfaction (SCS). The cost function for SCS-MMA is given as $$J_{SCS-MMAI}(n) = \quad (21)$$
$$E\left\{ \frac{|z_R(n)|^3}{3R_{2,R}} - \frac{z_R^2(n)}{2} + \frac{R_{2,R}^2}{6} + \frac{|z_I(n)|^3}{3R_{2,I}} - \frac{z_I^2(n)}{2} + \frac{R_{2,I}^2}{6} \right\}$$

where $$R_{2,R} = \frac{E[|a_R(n)|^3]}{E[|a_R^2(n)|]} \text{ and } R_{2,I} = \frac{E[|a_I(n)|^3]}{E[|a_I^2(n)|]}. \quad (22)$$

The error term for SCS-MMA is derived from equation (21) and is given as $$e(n) = z_R(n)\left(1 - \frac{|z_R(n)|}{R_{2,R}}\right) + jz_I(n)\left(1 - \frac{|z_I(n)|}{R_{2,I}}\right) \qquad (23)$$

SCS-MMA achieves equalization by forcing the real and imaginary parts of equalizer output onto a four-point contours with distance $R_2$ from the origin.

Time domain (TD) blind algorithms operate on a symbol-by-symbol basis processing a sample at a time. However in order to take advantage of DFT processing, a block-by-block processing algorithm which operates on a block of symbols at a time is described herein. This greatly improves computational cost and efficiency and is the most appropriate mode of processing for SC-FDMA FD equalization.

Using the CP embedded in the SC-FDMA block formation in adapting FD blind algorithms to its equalization. It should be noted that the frequency domain processing described herein may be applied without the use of overlap-save and overlap-add signal processing techniques because these techniques are employed in order to segment long streams of data for block processing and can be avoided with the inclusion of CP as described in Falconer, S. Ariyavisitakul, A. Benyamin-Seeyar, and B. Eidson, "Frequency domain equalization for single-carrier broadband wireless systems," *IEEE Communications Magazine*, vol. 40, no. 4, pp. 58-66, April 2002 incorporated herein by reference in its entirety. Additionally, since multiplication in frequency domain for discrete data is essentially circular convolution in time domain, overlap-save and overlap-add techniques helps in implementing linear convolution in frequency domain for cases where transmitted symbol is much longer than the channel impulse response. However, in SC-FDMA case, the received data are in blocks and this block of data, kept from IBI due to the appended CP, are fed into the equalizer for FD equalization.

A difference between the frequency domain equalization described herein and the frequency domain equalization (FDE) which is common in the literature. The FDE methods described in C. Chan, M. Petraglia, and J. Shynk, "Frequency-domain implementations of the constant modulus algorithm," in *Signals, Systems and Computers,* 1989. *Twenty-Third Asilomar Conference* on, vol. 2, 1989, pp. 663-669 and M. M. Usman Gul and S. A. Sheikh, "Design and implementation of a blind adaptive equalizer using frequency domain square contour algorithm," *Digit. Signal Process,* vol. 20, no. 6, pp. 1697-1710, December 2010 are linear convolution implemented through the use of overlap save method. In this disclosure, cyclic-prefixed single carrier system (CP-SCS) results in periodic transmitted symbols which trick the channel to perform circular convolution rather than linear convolution. The periodicity is then removed at the receiver before carrying out frequency domain equalization. This sort of transmission format eliminates the need for overlap save method. Therefore, the received symbol represented by equation (9) is fed into the equalizer.

Frequency domain implementation differs from time domain implementation due to the fact that the former performs block update of the tap weight vector while the latter performs sample by sample update. The block update of tap weight vector greatly improves computational complexity and convergence rate.

Figure 4:
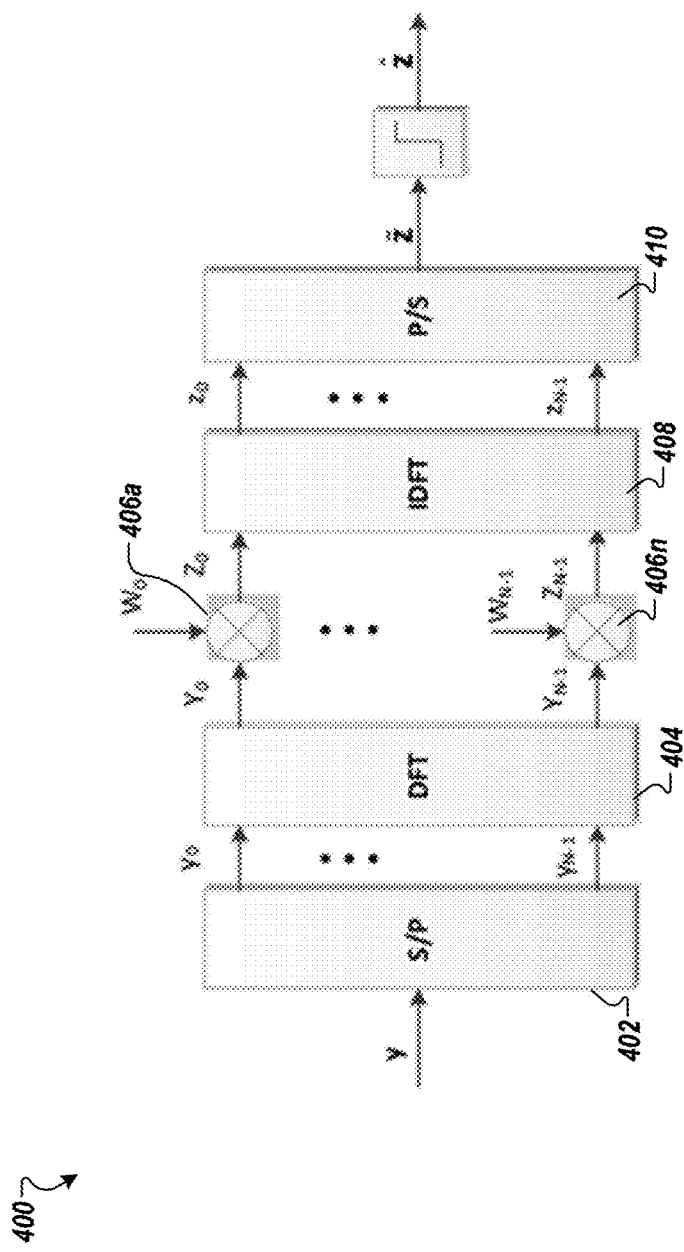
FIG. 4 is a block diagram of a frequency domain (FD) equalizer according to one example.

FIG. 4 is a block diagram of a FD equalizer 400 for a single user according to one example. The FD equalizer 400 may include a S/P converter 402, a DFT module 404, a filter module 406a, 406n, an IDFT module 408, and a P/S converter 410.

There are two major operations involved in time domain equalization as described previously herein. They are linear correlation in the update equation of equation (17) and linear convolution embodied by the filtering operation in equation (14).

DFT processing is used in implementing these two operations which lead to circular correlation and circular convolution, respectively. As mentioned earlier, the special nature of SC-FDMA which includes DFT processing and insertion of CP at the transmitter ensures that the received data is in blocks rather than long streams which implies that overlap-save or overlap-add sectioning methods is not used. The DFT of equalizer input and tap weight vector for kth received block can, respectively, be expressed as $$\Psi_k = F_N y_k \qquad (24)$$

and $$\Omega_k = F_N w_k \qquad (25)$$

where $$y_k = [y(0), y(1), \ldots, y(N-1)]^T \qquad (26)$$

and $$w_k = [w(0), w(1), \ldots, w(N-1)]^T \qquad (27)$$

Hence, the kth block of the equalizer output can be implemented with IDFT (e.g., IDFT module 408) as $$z_k = F_N^H (\Psi_k \varepsilon (D\Omega_k)^*) \qquad (28)$$

where $$z_k = [z(0), z(1), \ldots, z(N-1)]^T \qquad (29)$$

and e is the element-wise multiplication while matrix D, a 2N×2N matrix, is defined as $$D = \begin{bmatrix} 1 & 0 & 0 & \cdots & 0 & 0 \\ 0 & 0 & 0 & \cdots & 0 & 1 \\ 0 & 0 & 0 & \cdots & 1 & 0 \\ \vdots & \vdots & \vdots & \ddots & \vdots & \vdots \\ 0 & 0 & 1 & \cdots & 0 & 0 \\ 0 & 1 & 0 & \cdots & 0 & 0 \end{bmatrix} \qquad (30)$$

and is used to implement conversion between DFT of a vector and that of its complex conjugate. Equation (28) follows from the complex conjugation property of DFT. Using the equalizer output, the error factor can be calculated and the DFT of the error factor may be expressed as $$E_k = F_N e_k \qquad (31)$$

where $$e_k = [e(0), e(1), \ldots, e(N-1)]^T \qquad (32)$$

and $$e_k(n) = z_{k,R}(n)\left(1 - \frac{|z_{k,R}(n)|}{R_{2,R}}\right) + jz_{k,I}(n)\left(1 - \frac{|z_{k,I}(n)|}{R_{2,I}}\right) \qquad (33)$$

Note that in equation (33) the error factor is being calculated in time domain. It is stated earlier that only correlation and convolution operations, which correspond to computation of equalizer output and weight update respectively, are carried out in frequency domain. This is because error functions of blind equalizers are non-linear and their frequency domain implementation is not equivalent to their time domain implementation. However, for non-blind equalizers like LMS whose cost function is linear in the error term, then it is straight forward to extend its implementation to frequency domain.

The weight update recursion of (17) is then implemented with DFT as $$\Omega_{k+1} = \Omega_k - \mu D(\Psi^*_k \varepsilon E_k)^* \quad (34)$$

Both (28) and (34) completely describe the equalizer operation in frequency domain.

The error functions of equalizers are derived from their cost functions and this cost functions are different for different equalizers. Table 1 gives a synopsis of blind algorithm cost functions and their respective error functions.

TABLE 1

BLIND ALGORITHMS EQUATIONS

| Algorithm | Cost Function | Estimation Error (e(n)) |
|---|---|---|
| CMA | $E\{(|z(n)|^2 - R)^2\}$ | $4z(n)(|z(n)|^2 - R)$ |
| MMA | $E\{[|y_R(n)|^2 - R_{1,R}]^2 + [|y_I(n)|^2 - R_{1,I}]^2\}$ | $2[z_R(n)(z_R^2(n) - R_{1,R}) + jz_I(n)(z_I^2(n) - R_{1,I})]$ |
| SCS-MMA | $E\left\{\dfrac{|z_R(n)|^3}{3R_{2,R}} - \dfrac{z_R^2(n)}{2} + \dfrac{R_{2,R}^2}{6} + \dfrac{|z_I(n)|^3}{3R_{2,I}} - \dfrac{z_I^2(n)}{2} + \dfrac{R_{2,I}^2}{6}\right\}$ | $z_R(n)\left(1 - \dfrac{|z_R(n)|}{R_{2,R}}\right) + jz_I(n)\left(1 - \dfrac{|z_I(n)|}{R_{2,I}}\right)$ |

Following the preceding discussion, both CMA and MMA can be used using the method described herein. The convergence of SCS-MMA can be greatly improved by considering the square root of the spectral power as a normalization factor referred to herein as normalized frequency domain SCS-MMA (NFDSCS-MMA). Therefore, each frequency bin in the weight update equation of (34) is normalized by the spectral power of its respective input data. Both the power recursive and resulting normalized weight update equation are given by the following $$\Pi_k(i) = \lambda \Pi_{k-1}(i) + (1-\lambda)|\Psi_k(i)|^2, i=0,1,\ldots,N-1 \quad (35)$$

$$\Omega_{k+1} = \Omega_k + \mu D(\Psi^*_k \varepsilon E_k \% \Pi_k)^* \quad (36)$$

and $$\Pi_k = [\sqrt{\Pi(0)}, \sqrt{\Pi(1)}, \ldots, \sqrt{\Pi(N-1)}]^T \quad (37)$$

where λ A is a forgetting factor and % is an element-wise division operator.

A careful re-ordering of the normalized weight update equation reveals another insightful observation into its effectiveness in improving the equalizer convergence. It is seen that the normalization is tantamount to using variable step size in each of the frequency bin which amounts to power control on each bin and such technique is especially useful in applications where the input level is uncertain or vary widely across the band. In one embodiment, the method is repeated to realize normalized FDMMA and normalized FDCMA (NFDMMA) from the equations given in Table 1 and the details of the algorithm are given in FIG. 5.

Figure 5:
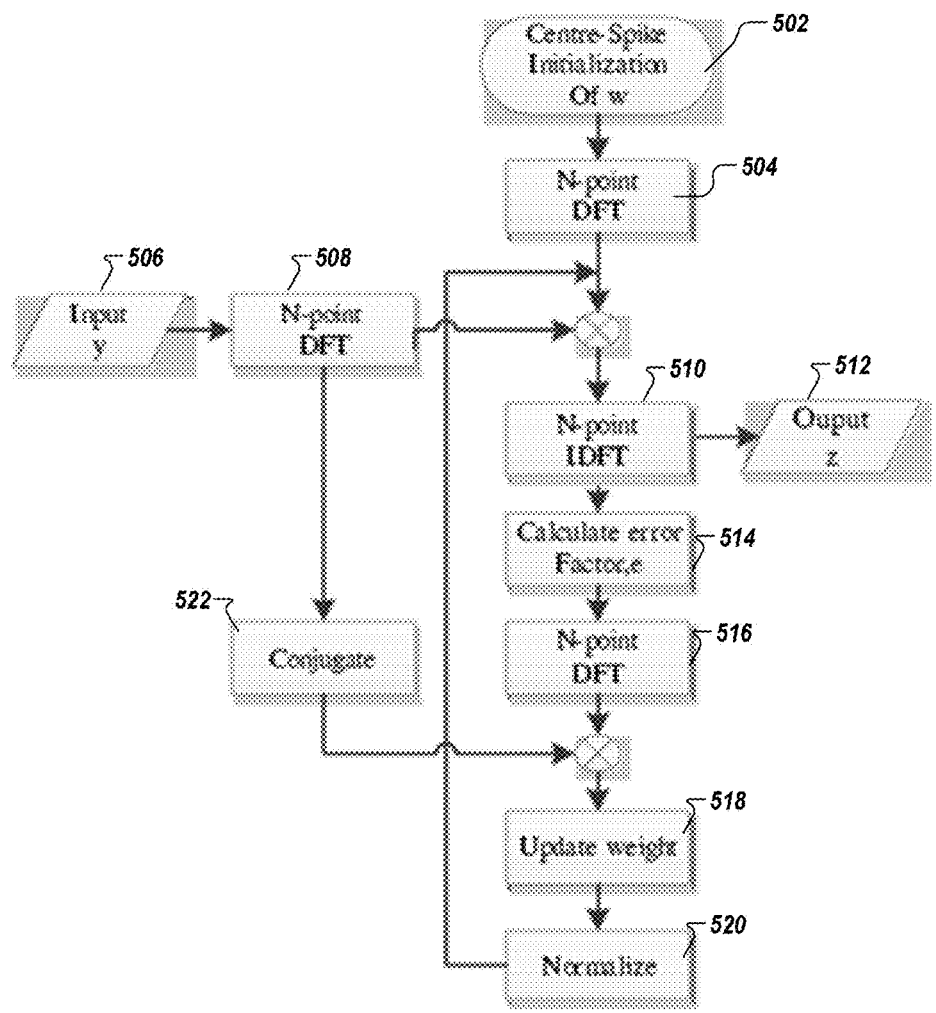
FIG. 5 is a flowchart that shows a normalized frequency domain soft-constraint satisfaction multimodulus algorithm (NFDSCS-MMA) for FD equalization according to one example.

FIG. 5 is a flowchart that shows a normalized frequency domain soft-constraint satisfaction multimodulus algorithm (NFDSCS-MMA) for FD equalization according to one example. The algorithm, for example, may be realized by the receiver 104 described in relation to FIG. 1.

At 502, the filter taps of order of N are initialized with centre-spike initialization. At 504, the N-point DFT of the filter taps is determined. In one example, the N-point DFT is determined using the DFT module 404. At 506, an input y may be received. At 508, the N-point DFT is determined. At 510, the N-point IDFT of the outputs from steps 504 and 508 is calculated. At 514, the error factor is determined. In one example, the error factor may be calculated using equation (32) and equation (33). At 516, the N-point DFT of the error factor is determined. At 518, the weights of the filter are updated as a function of the FD error factor and the conjugate of the FD input. The conjugate of the FD input is determined at 522. In one example, the weight are updated using equation (34). At 520, the tap weights are normalized by the spectral power of the input data. For example, the normalized weight may be determined using equation (36).

Figure 6:
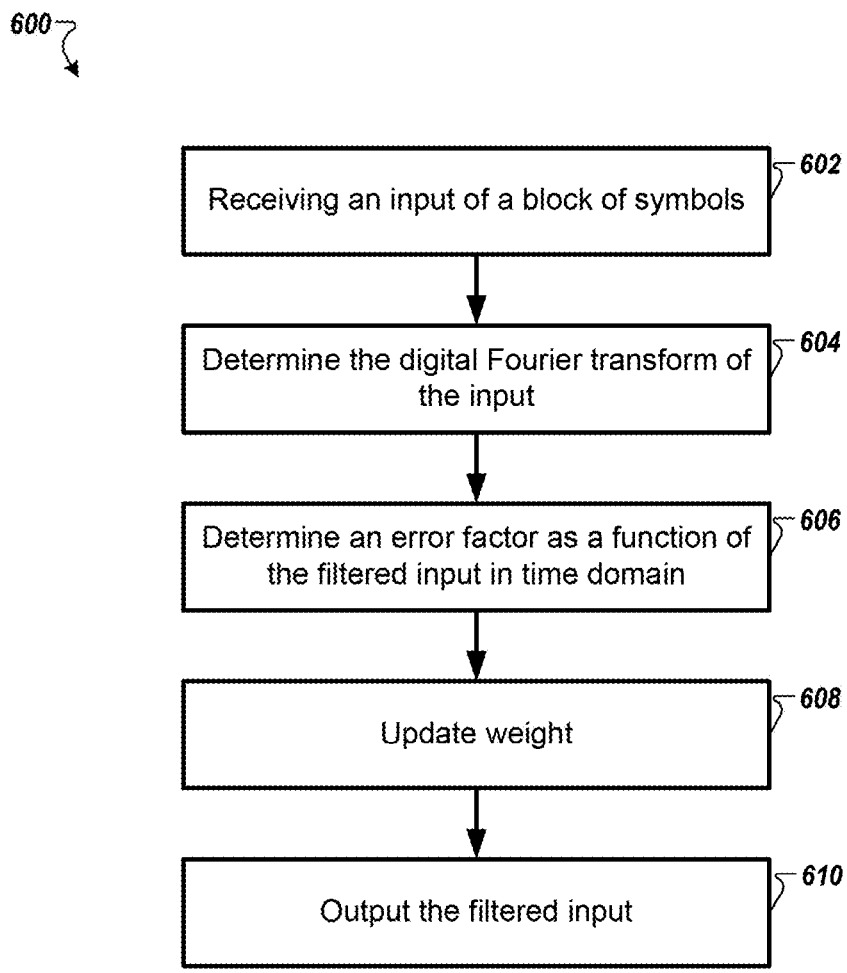
FIG. 6 is a flowchart that shows a method for FD equalization according to one example.

FIG. 6 is a flowchart 600 that shows a method for FD equalization according to one example. At 602, an input of a block of symbols is received by the equalizer 400. At 604, the digital Fourier transform of the input is calculated. In one example, the digital Fourier transform may be calculated by the DFT module 404. Then, the FD input may be filtered using the filter taps (e.g., 406a, . . . 406n). Then, at 606, an error factor is determined as a function of the filterd time domain input. Then at 608, the tap weights are updated via equation (36) or (34). Steps 604-608 may be repeated. At 610, the output of the equalizer 400 is outputted.

To illustrate the capabilities of the systems and methodologies described herein, exemplary results are presented.

The algorithms described herein were investigated by means of computer simulations in MATLAB environment. Specifically, the performance of both frequency domain soft-constraint multimodulus algorithm (FDSCS-MMA) and improved FDSCS-MMA are evaluated and compared their performance with the constant modulus algorithm CMA and its modified version MMA. In order to simulate multi-user environment, a transmitter FFT size of 256 is used which is equivalent to the total available subcarriers in the system (M), input FFT size for a user is 64 same as the number of subcarriers available for each user (N) and length of CP is 20 samples (P). This makes a total number of 4 users whose data were transmitted simultaneously.

The mean square error (MSE) convergence curve in dB was obtained as ensemble average and is plotted as a function of the number of iterations where each iteration represent an SC-FDMA symbol consisting of all the users' signal for that transmission time. The filter taps are of the order of N with center-spike initialization. The modulation scheme employed for SCFDMA transmission is 4QAM. The localized carrier transmission mode is used in LTE uplink since it offers much better performance with the arrangement of pulse-shaping filter. Simulation results are averaged over 100 Monte Carlo iterations and are done for LFDMA since DFDMA is no longer supported in 3GPP LTE standard.

The values of $R_{2,R}$, $R_{2,I}$ and $\lambda$ are 1,1 and 0.55, respectively. The step size for the equalizers are $4\times10^{-3}$, $3\times10^{-3}$, $3\times10^{-4}$ and $1\times10^{-4}$ for NFDSCS-MMA, FDSCS-MMA, NFDMMA, NFDCMA, respectively. The channel considered is frequency selective with 6-paths and each path fades independently, according to the Rayleigh distribution. Vehicular speed of $1\times10^{-4}$ is used to account for time variation in the channel. The additive white Gaussian noise have been chosen such that the signal to noise ratio (SNR) at the input of the equalizer is 20 dB. SNR of 10 dB is also considered for comparison of low and high SNR performance.

Figure 7:
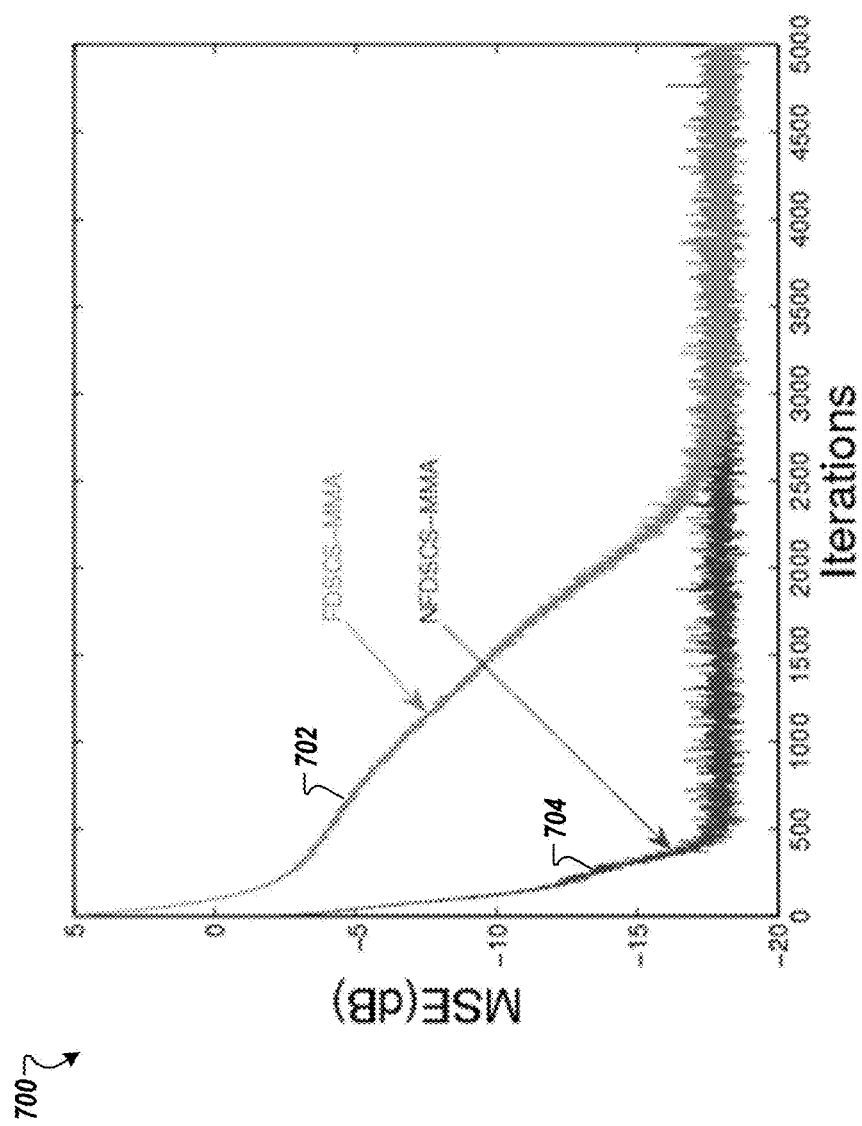
FIG. 7 is a schematic that shows the mean squared error (MSE) comparison curves between NFDSCS-MMA and frequency domain soft-constraint satisfaction multimodulus algorithm (FDSCS-MMA) according to one example.

FIG. 7 is a schematic 700 that shows the performance of NFDSCS-MMA and FDSCS-MMA according to one example. Trace 702 shows the convergence for FDSCS-MMA and trace 704 shows the convergence for NFDSC-MMA. The two algorithms achieve the same residual MSE but have different convergence time. It is seen that FDSCS-MMA took a longer time to converge, about 3,000 symbols. This slow adaptation is a setback in broadband wireless communication system which typically requires high speed transmission. The convergence rate was then improved greatly by considering a normalization factor leading to NFDSCS-MMA which converges at about 500 symbols. This corresponds to almost 83% improvement in symbols saving over the algorithm without normalization for the same residual MSE. It can be deducted from the curves 702,704 that the effect of appropriate normalization is to provide better convergence seeing that both algorithms achieve the same residual MSE. Based on the preceeding discussion, only normalized versions of the blind algorithms described herein are further tested.

Figure 8:
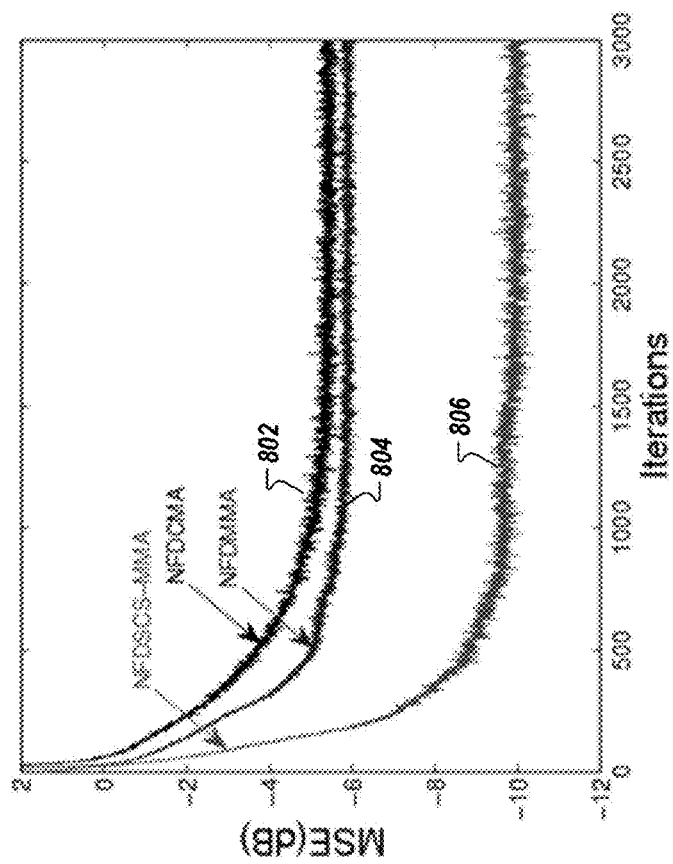
FIG. 8 is a schematic that shows MSE comparison curves for blind algorithms according to one example.

FIG. 8 is a schematic 800 that shows MSE comparison curves for blind algorithms for an SNR=10 dB. Trace 802 shows the MSE for the NFDCMA. Trace 804 shows the MSE for NFDMMA. Trace 806 shows the MSE for NFDSCS-MMA.

Figure 9:
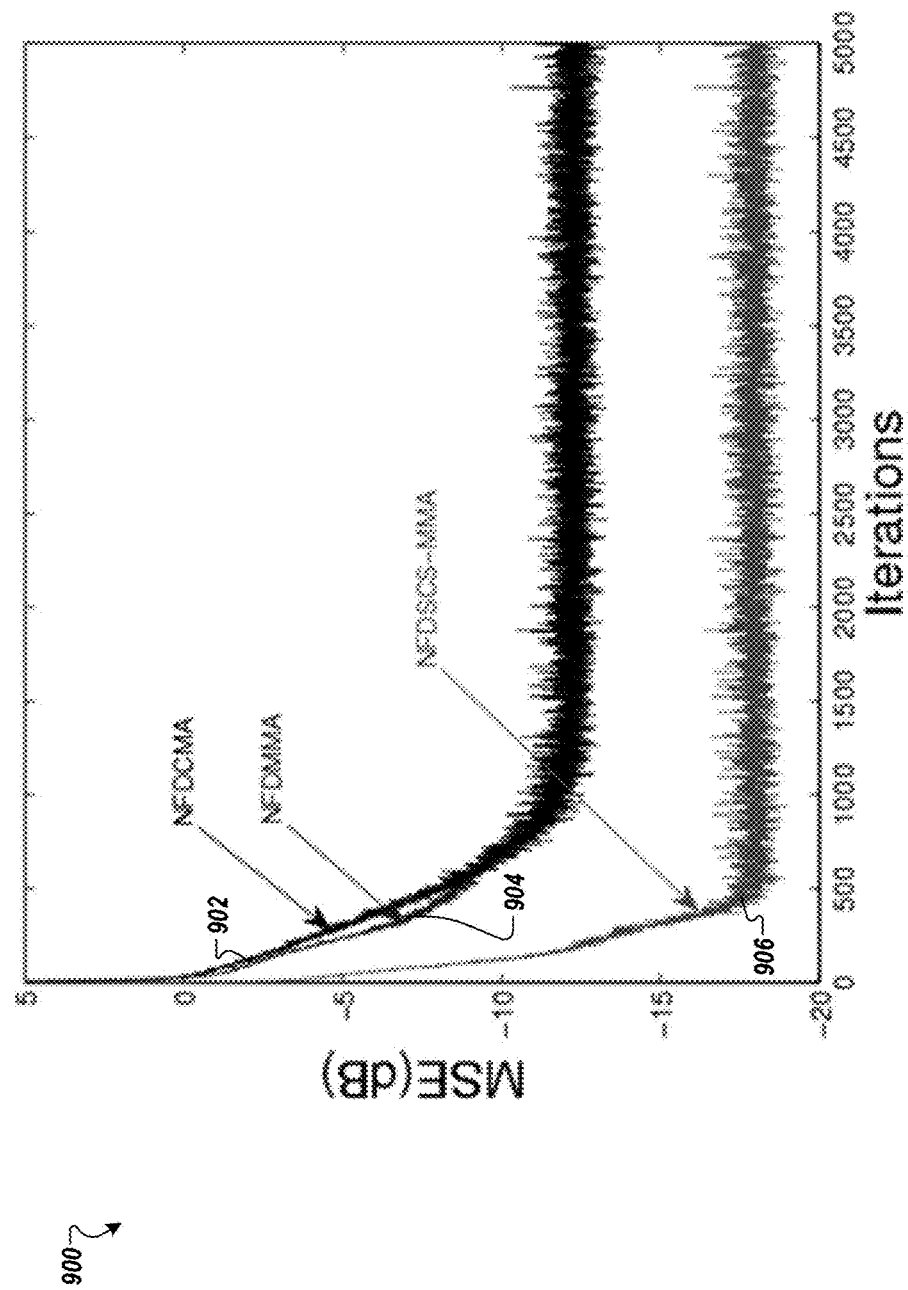
FIG. 9 is a schematic that shows MSE comparison curves for blind algorithms according to one example.

FIG. 9 is a schematic 900 that shows MSE comparison curves for blind algorithms for an SNR 20 dB. Trace 902 shows the MSE for the NFDCMA. Trace 904 shows the MSE for NFDMMA. Trace 906 shows the MSE for NFDSCS-MMA.

Normalised versions are considered due to their faster convergence rate compared to unnormalized versions. Normalized FDSCS-MMA achieve fastest MSE convergence rate and lower residual error for the case of low and high SNR. NFDMMA is slightly better than NFDCMA at low SNR while both of them achieve similar MSE performance at high SNR of 20 dB.

Figure 10:
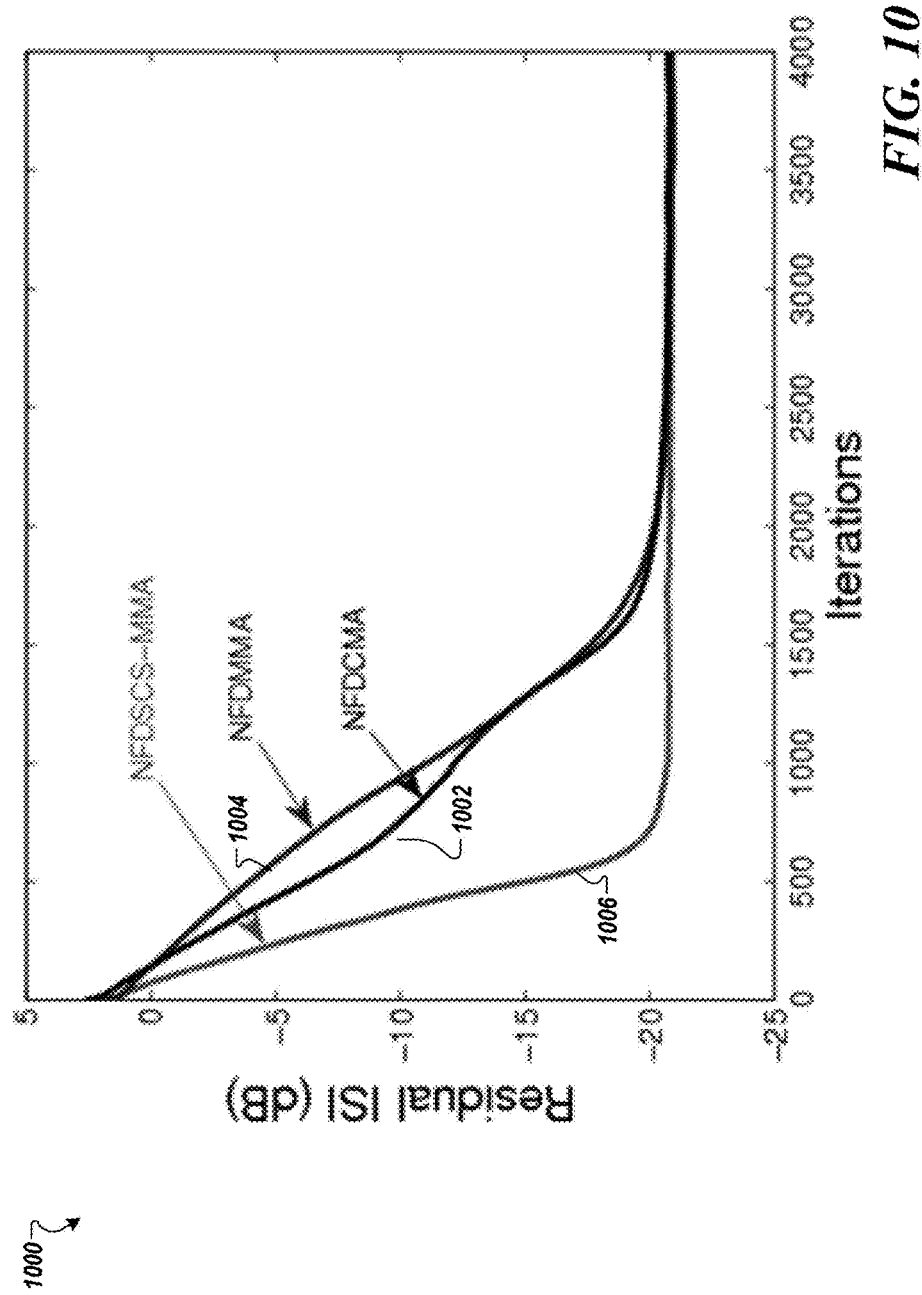
FIG. 10 is a schematic that shows residual Intersymbol interference (ISI) convergence curves for blind algorithms according to one example.

FIG. 10 is a schematic 1000 that shows residual ISI convergence curves for blind algorithms according to one example. Trace 1002 shows the residual ISI for the NFDCMA. Trace 1004 shows the residual ISI for NFDMMA. Trace 1006 shows the residual ISI for NFDSCS-MMA.

Figure 11:
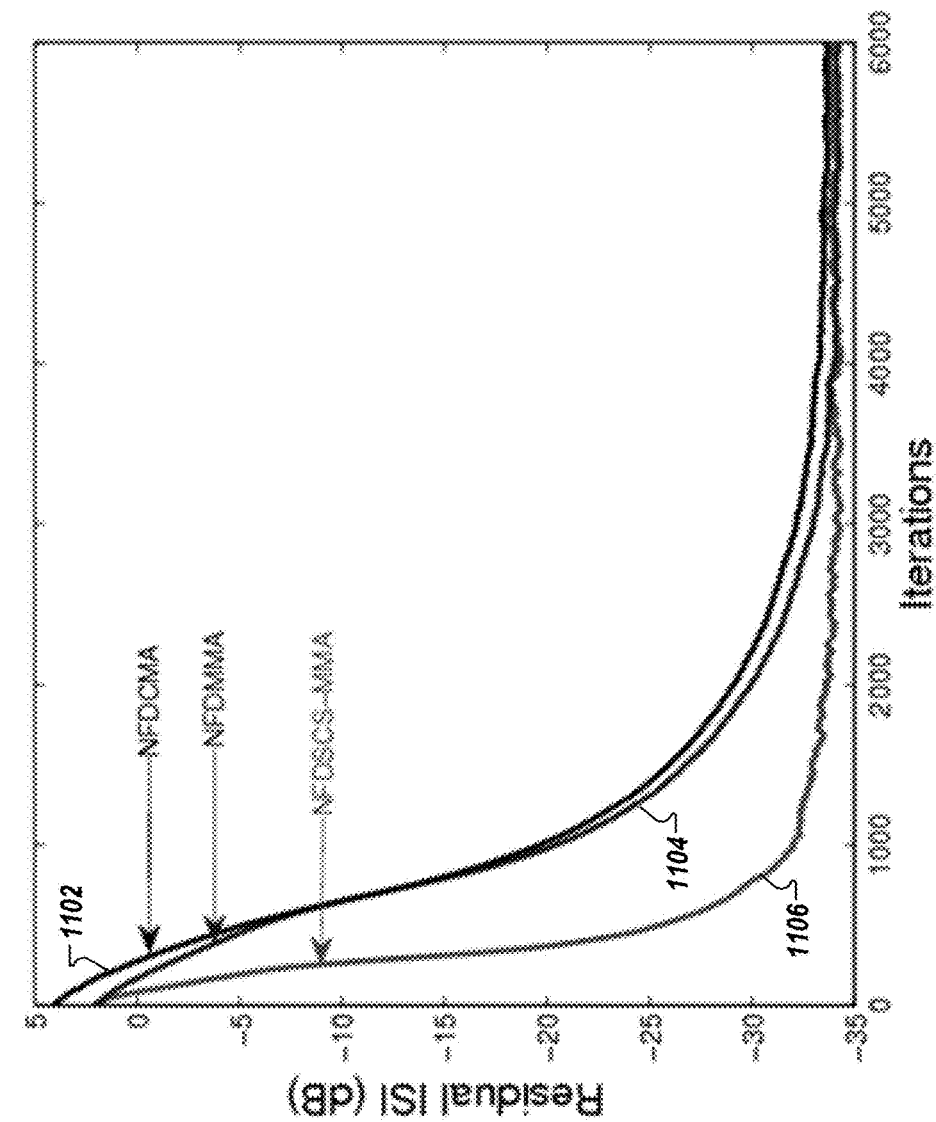
FIG. 11 is a schematic that shows residual ISI convergence curves for blind algorithms according to one example.

FIG. 11 is a schematic 1100 that shows residual ISI convergence curves for blind algorithms according to one example. Trace 1102 shows the residual ISI for the NFDCMA. Trace 1104 shows the residual ISI for NFDMMA. Trace 1106 shows the residual ISI for NFDSCS-MMA.

Schematics 1000, 1100 shows the convergence behaviour and residual ISI of the proposed algorithms. The residual ISI at the output of the equalizer at nth iteration is given as $$ISI(n) = \frac{\Sigma |s(n)|^2 - |s(n)|^2_{max}}{|s(n)|^2_{max}} \tag{38}$$

where $s(n)=h(n)*w*(n)$, $s(n)$ is the overall impulse response of the transmission channel, $h(n)$, and equalizer, $w(n)\cdot|s(n)|_{max}$ is the component with maximum absolute value among all the components of $|s(n)|$ and [*] denotes convolution.

The results show that all the algorithms are able to remove ISI but NFDSCS-MMA has better convergence performance than both NFDMMA and NFDCMA. The algorithms achieve same residual ISI but NFDSCS-MMA converges fastest for both low and high SNR scenarios and as a result, gives better performance.

The phase recovery capability of the algorithms described herein for both 16-QAM and 64-QAM, is investigated.

Figure 12:
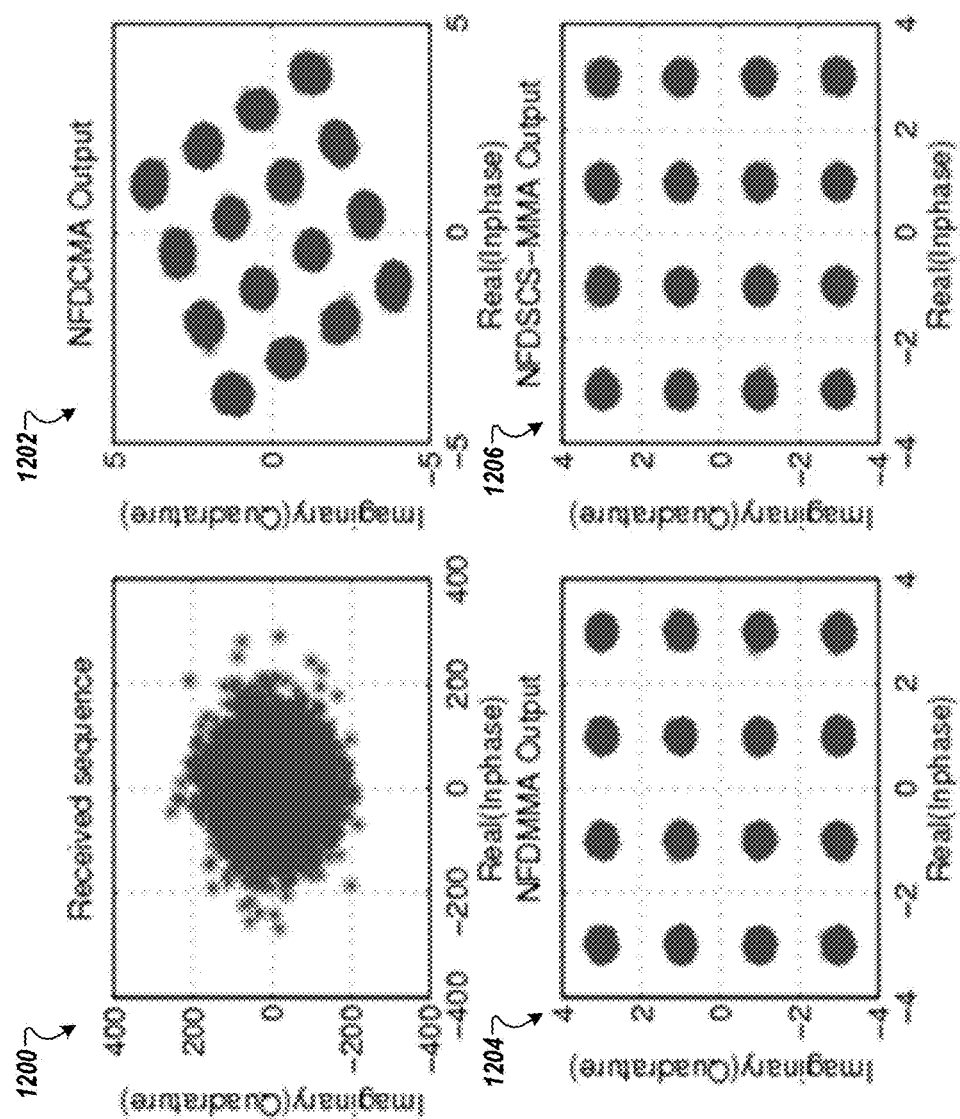
FIG. 12 is a schematic that shows a 16-quadrature amplitude modulation (QAM) constellation without a carrier offset according to one example.

FIG. 12 is a schematic that shows a 16-QAM constellation without a carrier offset according to one example. Schematic 1200 shows the received sequence. Schematic 1202 shows the output using the NFDCMA algorithm. Schematic 1204 shows the output using NFDMMA algorithm. Schematic 1206 shows the output using the NFDSCS-MMA algorithm.

Figure 13:
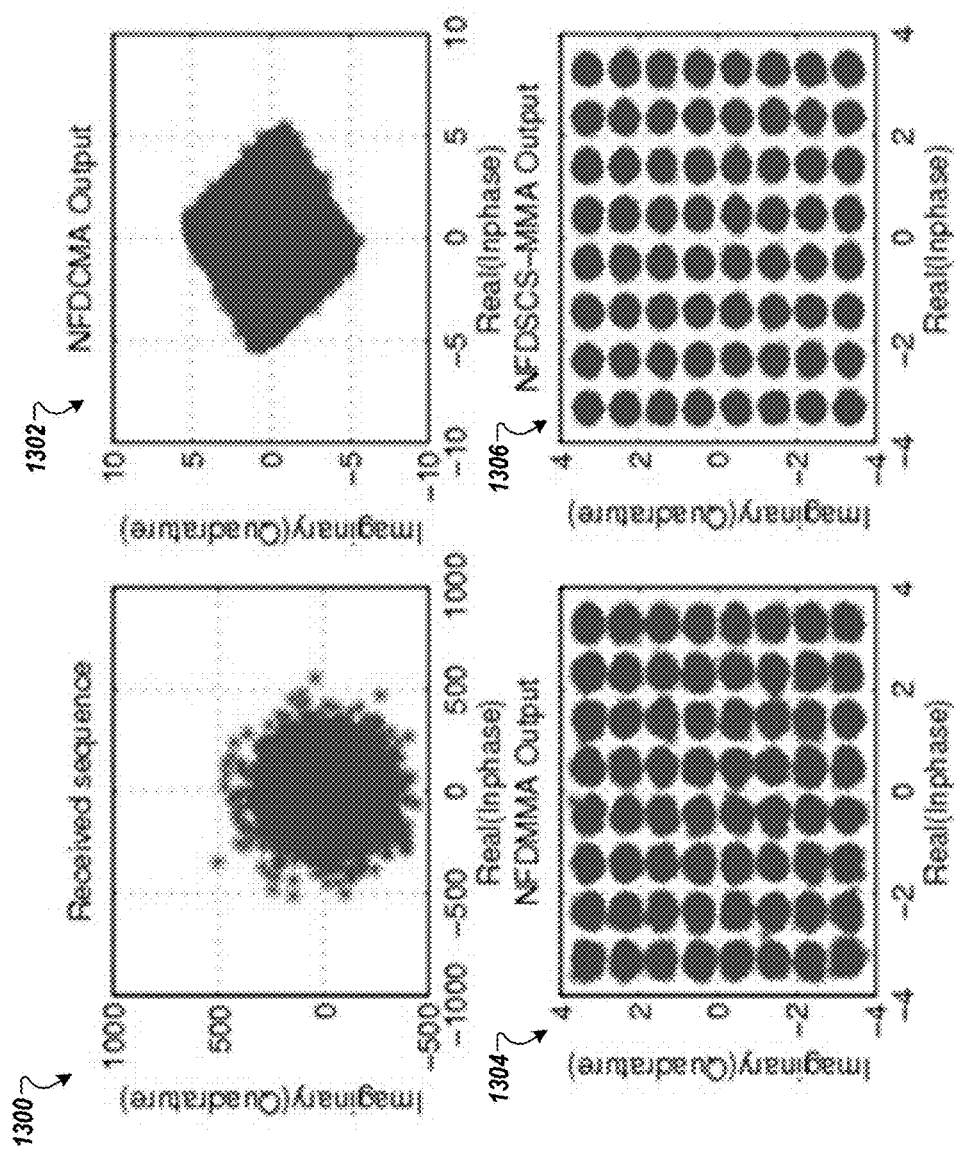
FIG. 13 is a schematic that shows a 64-QAM without a carrier offset according to one example.

FIG. 13 is a schematic that shows a 64-QAM without a carrier offset according to one example. Schematic 1300 shows the received sequence. Schematic 1302 shows the output using the NFDCMA algorithm. Schematic 1304 shows the output using NFDMMA algorithm. Schematic 1306 shows the output using the NFDSCS-MMA algorithm.

All the algorithms are able to recover 16-QAM symbol constellation but only NFDMMA and NFDSCS-MMA are able to recover 64-QAM symbol constellation. However, NFDSCS-MMA constellation is better than that of NFDMMA. It is also seen that NFDCMA is not able to correct the phase rotation introduced by the channel characteristics and that both NFDMMA and NFDSCS-MMA do this perfectly. This is due to the fact that both equalizers achieve equalization by forcing both the real and imaginary parts of the equalizer output onto four-point contours which results in simultaneous blind equalization and carrier phase recovery.

Figure 14:
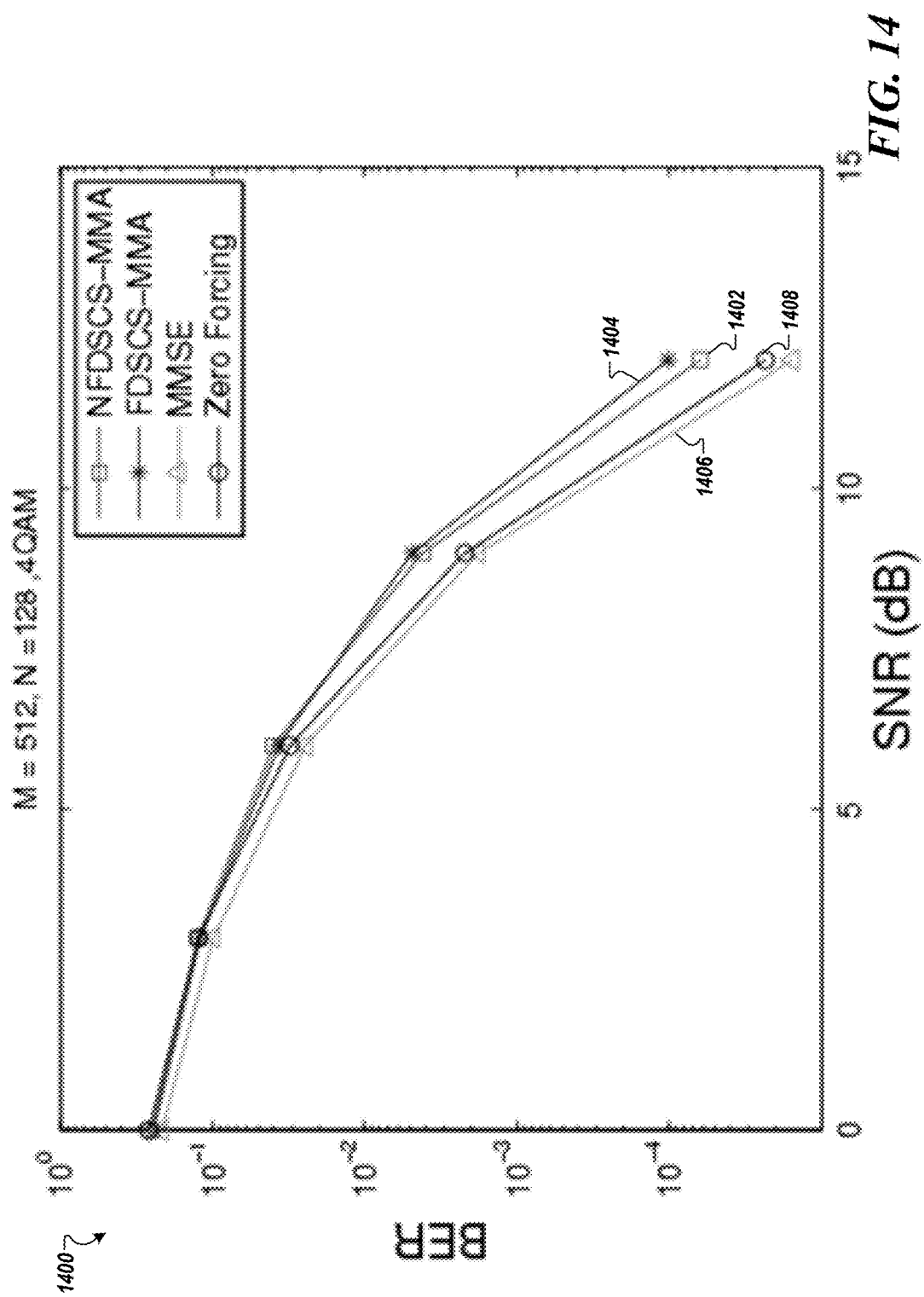
FIG. 14 is a schematic that shows a bit error rate (BER) comparison of NFDSCS-MMA and linear MMSE according to one example.

FIG. 14 is a schematic 1400 that shows a BER comparison of NFDSCS-MMA and linear MMSE according to one example.

Schematic 1400 shows the BER performance of both FDSCS-MMA with its normalized version compared to optimum equalizers which are minimum mean square (linear MMSE) and zero forcing equalizers. In order to assess the BER performance of NFDSCS-MMA, knowledge of the first 2 received symbols has been assumed since SCS-MMA only minimizes the dispersion between real and imaginary parts of the received signal and a four-point contours of distance $R_2$. This assumption is required to correct the received signal phase as "blind" in blind equalizers is with respect to the phase hence, they are said to be blind to the "phase".

Trace 1402 shows the BER for the NFDSC-MMA. Trace 1404 shows the BER for FDSCS-MMA. Trace 1406 shows the BER for MMSE. Trace 1408 shows the BER for zero forcing.

Both NFDSCS-MMA (trace 1402) and FDSCS-MMA (trace 1404) achieve similar BER performance which is slightly less than that of linear MMSE (trace 1406). In situations where blind equalizers are used to open the eye of the signal constellation, a probability of symbol error of $10^{-2}$ is considered acceptable. From schematic 1400, it is seen that to achieve this acceptable performance, 8 dB is required for NFDSCS-MMA (trace 1402) as compared to that of 7 dB for linear MMSE (1406) which is a small tradeoff compare to 14% improvement in throughput.

Figure 15:
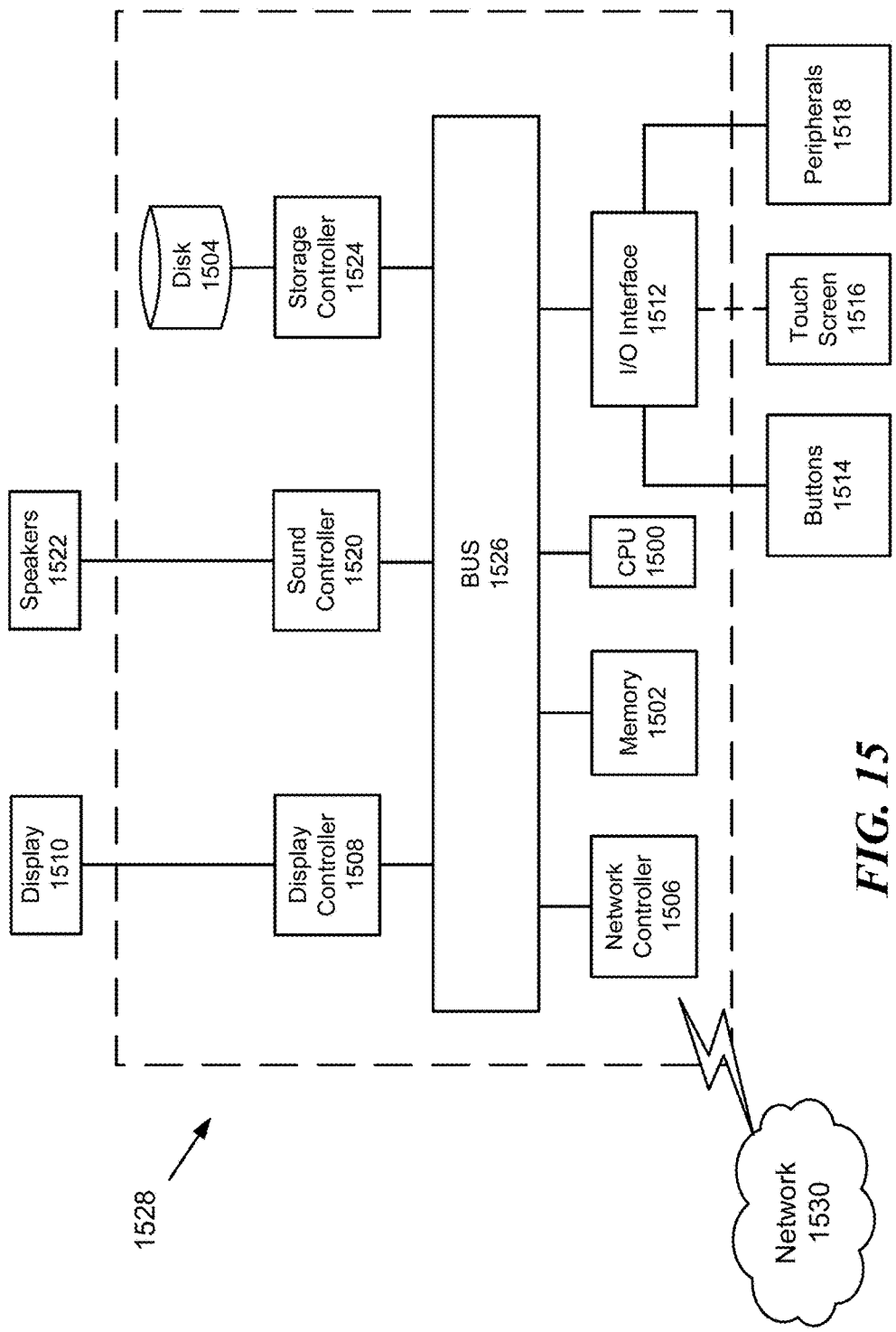
FIG. 15 is an exemplary block diagram of a computer according to one example.

FIG. 15 is a block diagram showing an example of a hardware configuration of a computer that can be configured to perform functions of any one or a combination of reception apparatus and transmission apparatus. For example, in one embodiment, the computer is configured to perform the functions in the digital domain such as the transmitter 100 or the receiver 104.

Next, a hardware description of the computer according to exemplary embodiments is described with reference to FIG. 15. In FIG. 15, the computer 1528 includes a CPU 1500 which performs the processes described herein. The process data and instructions may be stored in memory 1502. These processes and instructions may also be stored on a storage medium disk 1504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1528 communicates, such as a server or computer.

Further, the claimed advancements may be provided as a utility application, background daemon, or component of an operating system, or combination thereof, executing in conjunction with CPU 1500 and an operating system such as Microsoft Windows 7, UNIX, Solaris, LINUX, Apple MAC-OS and other systems known to those skilled in the art.

In order to achieve the computer 1528, the hardware elements may be realized by various circuitry elements, known to those skilled in the art. For example, CPU 1500 may be a Xenon or Core processor from Intel of America or an Opteron processor from AMD of America, or may be other processor types that would be recognized by one of ordinary skill in the art. Alternatively, the CPU 1500 may be implemented on an FPGA, ASIC, PLD or using discrete logic circuits, as one of ordinary skill in the art would recognize. Further, CPU 1500 may be implemented as multiple processors cooperatively working in parallel to perform the instructions of the inventive processes described above.

The computer 1528 in FIG. 15 also includes a network controller 1506, such as an Intel Ethernet PRO network interface card from Intel Corporation of America, for interfacing with network 1530. As can be appreciated, the network 1530 can be a public network, such as the Internet, or a private network such as LAN or WAN network, or any combination thereof and can also include PSTN or ISDN sub-networks. The network 1530 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer 1528 further includes a display controller 1508, such as a NVIDIA GeForce GTX or Quadro graphics adaptor from NVIDIA Corporation of America for interfacing with display 1510, such as a Hewlett Packard HPL2445w LCD monitor. A general purpose I/O interface 1512 interfaces with a keyboard and/or mouse 1514 as well as a an optional touch screen panel 1516 on or separate from display 1510. General purpose I/O interface also connects to a variety of peripherals 1518 including printers and scanners, such as an OfficeJet or DeskJet from Hewlett Packard.

A sound controller 1520 is also provided in the computer 1528, such as Sound Blaster X-Fi Titanium from Creative, to interface with speakers/microphone 1522 thereby providing sounds and/or music.

The general purpose storage controller 1524 connects the storage medium disk 1504 with communication bus 1526, which may be an ISA, EISA, VESA, PCI, or similar, for interconnecting all of the components of the computer 1528. A description of the general features and functionality of the display 1510, keyboard and/or mouse 1514, as well as the display controller 1508, storage controller 1524, network controller 1506, sound controller 1520, and general purpose I/O interface 1512 is omitted herein for brevity as these features are known.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

A system which includes the features in the foregoing description provides numerous advantages to users. In particular, a frequency domain soft-constraint multimodulus algorithm for single carrier is described. As described previously herein, the algorithm outperforms the popular blind algorithm, CMA and its modified version, MMA in both residual MSE and convergence rate. Phase recovery capability of the algorithm described herein is also demonstrated with acceptable BER performance. This suggests that SC-FDMA can be perfectly equalized in broadband systems using the algorithms of this disclosure with the resultant lower MSE, faster convergence and improved spectral efficiency.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for equalization in a single carrier frequency division multiple access communication system, the apparatus comprising:
    processing circuitry configured to
    receive an input of a block of symbols, the block symbols being periodic transmitted symbols and being circularly convoluted by a channel,
    calculate a digital Fourier transform of the input by applying an N-point discrete Fourier transform or an M-point inverse discrete Fourier transform,
    filter the input in the frequency domain based on tap weights,
    calculate an error factor in the time domain based on the filtered input,
    update the tap weights in the frequency domain using circular correlation based on a conjugate of an element wise multiplication between the error factor and the conjugate of the input in the frequency domain, and
    output the filtered input, wherein updating the tap weights includes applying $$\Omega_{k+1} = \Omega_k - \mu D(\Psi *_k \mathbb{E} \Omega_k)^*$$

where $\Omega$ is a tap weight vector in the frequency domain, $\Psi$ is the input in the frequency domain, E is an error factor in the frequency domain, D is a predefined matrix, $\varepsilon$ is element wise multiplication, k is a number of blocks, and $\mu$ is a predetermined factor.

2. The apparatus of claim 1, wherein the processing circuitry is configured to:
    initialize the tap weights using central spike.

3. The apparatus of claim 1, wherein the processing circuitry is configured to:
    normalize each frequency bin as a function of the spectral power associated with input data associated with each frequency bin.

4. The apparatus of claim 1, wherein calculating the error factor includes applying $$e_k(n) = z_{k,R}(n)\left(1 - \frac{|z_{k,R}(n)|}{R_{2,R}}\right) + jz_{k,I}(n)\left(1 - \frac{|z_{k,I}(n)|}{R_{2,I}}\right)$$

where R is a constant, k is a number of blocks, n is a number of equalizer input, and z is the filtered input.

5. The apparatus of claim 1, wherein calculating the error factor includes applying $$e_k(n) = 4z(n)(|z(n)|^2 - R)$$

where R is a constant, k is a number of blocks, n is a number of equalizer input, and is the filtered input.

6. The apparatus of claim 1, wherein calculating the error factor includes applying $$e_k(n) = 2[z_R(n)(z_R^2(n) - R_{1,R}) + jz_I(n)(z_I^2(n) - R_{1,I})]$$

where R is a constant, k is a number of blocks, n is a number of equalizer input, and z is the filtered input.

* * * * *